United States Patent
Chaveron

(10) Patent No.: US 11,406,111 B2
(45) Date of Patent: Aug. 9, 2022

(54) METHOD FOR THE DEMINERALISATION OF WHEY AND WHEY THUS OBTAINED

(71) Applicant: SYNUTRA FRANCE INTERNATIONAL, Carhaix-Plouguer (FR)

(72) Inventor: Michel Chaveron, La Tour de Peilz (CH)

(73) Assignee: SYNUTRA FRANCE INTERNATIONAL, Carhaix-Plouguer (FR)

( * ) Notice: Subject to any disclaimer, the term of this patent is extended or adjusted under 35 U.S.C. 154(b) by 0 days.

(21) Appl. No.: 16/981,540

(22) PCT Filed: Mar. 21, 2019

(86) PCT No.: PCT/FR2019/050652
§ 371 (c)(1),
(2) Date: Sep. 16, 2020

(87) PCT Pub. No.: WO2019/180389
PCT Pub. Date: Sep. 26, 2019

(65) Prior Publication Data
US 2021/0112821 A1 Apr. 22, 2021

(30) Foreign Application Priority Data
Mar. 21, 2018 (FR) ...................... 18 52410

(51) Int. Cl.
*A23C 9/144* (2006.01)
*A23C 21/00* (2006.01)

(52) U.S. Cl.
CPC .............. *A23C 9/144* (2013.01); *A23C 21/00* (2013.01)

(58) Field of Classification Search
CPC ................................ A23C 9/144; A23C 21/00
USPC .......................................................... 426/41
See application file for complete search history.

(56) References Cited

U.S. PATENT DOCUMENTS

| | | | |
|---|---|---|---|
| 3,325,389 A | 6/1967 | Parsi et al. | |
| 4,138,501 A | 2/1979 | Chaveron et al. | |
| 4,844,923 A | 7/1989 | Herrmann | |
| 5,260,080 A | 11/1993 | Noel | |
| 5,747,647 A | 5/1998 | Stack et al. | |
| 5,851,372 A | 12/1998 | Noel | |
| 6,383,540 B1 | 5/2002 | Noel | |
| 2008/0171118 A1 | 7/2008 | Bazinet et al. | |

FOREIGN PATENT DOCUMENTS

| | | | | |
|---|---|---|---|---|
| EP | 0080933 A1 | * | 6/1983 | ........... A23C 19/053 |
| JP | S4954568 A | * | 5/1974 | |
| JP | S4954568 A | | 5/1974 | |

OTHER PUBLICATIONS

Simova et al.,"Demineralization of natural sweet whey by electrodialysis at pilot-plant scale", Desalination and Water Treatment: Science and Engineering; DWT.UK, vol. 14, No. 1-3, Feb. 3, 2010 (Feb. 3, 2010), pp. 170-173. (Year: 2010).*
Translation of EP-0080933-A1 (Year: 1983).*
Translation of JPS4954568A (Year: 1974).*
The English translation of the International Search Report, dated Jun. 21, 2019, in PCT Appl. No. PCT/FR2019/050652.
Hana StMova et al. "Demineralization of natural sweet whey by electrodialysis at pilot-plant scale" Desalination and Water Treatment : Science and Engineering ; DWT, UK, vol. 14, No. 1-3, Feb. 3, 2010 (Feb. 3, 2010), pp. 170-173.

* cited by examiner

*Primary Examiner* — Brent T O'Hern

(57) ABSTRACT

The invention relates to the field of dairy products and particularly concerns a method for the demineralization of whey. The method according to the invention comprises the following steps: obtaining a whey, electrodialysis of the whey at a temperature of 30° C. to 60° C., acidification of the whey to a pH of between 2 and 3.5, pasteurization of the acidified whey, electrodialysis of the pasteurized acidified whey at a temperature of 30° C. to 60° C., and neutralization of the demineralized whey to a pH between 6.7 and 7.2. The method according to the invention makes it possible to achieve the whey demineralization using only the method of electrodialysis while avoiding the problems conventionally encountered with this method, namely a limited demineralization rate, fouling of the membranes, and an insufficient service life.

11 Claims, No Drawings

METHOD FOR THE DEMINERALISATION OF WHEY AND WHEY THUS OBTAINED

This application is a National Stage Application of PCT/FR2019/050652 filed Mar. 21, 2019, which claims priority from French Patent Application No. 18 52410, filed on Mar. 21, 2018. The priority of said PCT and French Patent Application are claimed. Each of prior mentioned applications is hereby incorporated by reference herein in its entirety.

The invention relates to the field of dairy products and particularly concerns a method for the demineralization of whey.

Whey is the liquid part resulting from the coagulation of milk, said coagulation being caused by denaturation of the major protein in milk, casein. There are two types of coagulation, each leading to two different types of whey. Depending on whether the coagulation is lactic coagulation or rennet coagulation, the whey obtained is respectively referred to as acid whey or sweet whey. Whey is also called cheese whey.

For decades, finding a use for whey has raised both economic and ecological issues. Indeed, although the composition is of interest, whey has a Chemical Oxygen Demand (COD) of 50 g/L to 70 g/L, which makes it an organic pollutant that cannot be released into the environment and that is expensive to transport.

Recycling methods have therefore emerged over time, particularly by means of demineralization methods which allow obtaining demineralized whey.

Currently, liquid or powder demineralized whey is the main component of infant and dietary products, particularly milk substitutes for breast milk Demineralized whey also has other applications, for example as a replacement ingredient for skim milk in confectionery and chocolates or in the manufacture of reconstituted milk.

Various techniques can be considered for the demineralization of whey, in particular ultrafiltration, reverse osmosis, electrodialysis, and ion exchange. As the first two techniques are far too specific, only the last two have found real industrial applications. The most effective whey demineralization methods today are therefore electrodialysis and ion exchange, which are applied separately or in combination.

Electrodialysis is an electrochemical technique which makes it possible to selectively remove ionized salts from a solution by migration under the influence of an electric field, through membranes which are selectively permeable to cations and to anions. In this technique, the ionized salts in solution in whey migrate under the effect of an electric field, through membranes selectively permeable to cations and anions, and are eliminated in the form of brines. However, electrodialysis poses several problems. Its operation is known to be irregular, the whey demineralization ratio is limited, the membranes tend to clog and their lifespan is relatively limited. In addition, there are certain limiting factors, for example the slow speed at which the anions move, as well as the difficulty in dissociating all the salts.

Ion exchange is a technique based on the principle of ionic equilibria existing between a solid phase and a liquid phase and involves absorption and exclusion phenomena. In this technique, the ionic equilibrium between a resin as the solid phase and the whey to be demineralized as the liquid phase is used, the ions being absorbed on the resin of the same nature during the saturation phase, then the resins are subsequently regenerated. One of the disadvantages of this technique lies in the fact that very large quantities of water are necessary and regeneration reagents must be used in abundance, reagents which we do not really know what to do with after use. In addition, on an industrial scale, this technique requires systems of daunting size, particularly due to the height of the column containing the resin, which can reach several meters in some cases. Finally, another disadvantage lies in the fact that the application of this technique is discontinuous, with approximately 40% of the time being dedicated to the demineralization of whey and approximately 60% of the time to washing the resins and to their regeneration.

To increase the productivity of demineralization, U.S. Pat. No. 4,803,089 thus describes the combination of these two techniques in a two-step method, the electrodialysis providing a first demineralization of about 50-60%, and the ion exchange, preferably multistage with successive weak cationic and strong cationic resins, achieving a final demineralization of about 90-95%.

Also known from U.S. Pat. No. 4,138,501 is a method for demineralizing a clarified and skimmed whey by electrodialysis followed by ion exchange firstly with a strong cation exchange resin in H+ form followed by a weak anion exchange resin in OH— form. In a variant of the described method, the whey may optionally be pasteurized before the ion exchange step over the exchange resin.

These types of methods have the disadvantage that the ion exchange step requires large amounts of chemical regenerant and also consumes very significant quantities of water. In addition, until the present time electrodialysis has not been used beyond a demineralization rate of 60%, due in particular to the high demand for electrical energy.

Also known, from patent EP 1 053 685, is a method for treating whey for the purposes of its demineralization, comprising a step of separating the salts by transfer through nanofiltration membranes, characterized in that it comprises, upstream of this separation step and successively, at least one step of replacing divalent cations with protons and at least one step of replacing divalent anions with chloride ions.

U.S. Pat. No. 3,325,389 describes a method for demineralizing whey by electrodialysis, in which said whey is subjected to a heat treatment step of 130° F. to 145° F. (54° C. to 63° C.) for a maximum of 30 hours, preferably a maximum of 2 hours, while maintaining the pH at about 4 to 5 in order to precipitate the demineralization inhibitors and to increase the speed of the demineralization by electrodialysis.

However, although whey demineralization solutions have been proposed, there is still a need to develop new, more effective alternatives that make it possible in particular to meet the growing demand for whey recycling.

The inventors have successfully been able to develop a method for the demineralization of whey which overcomes some or all of the problems described above, while obtaining a qualitative product offering advantages in terms of production costs and size of the industrial facilities.

Thus, an object of the invention relates to a method for demineralizing whey comprising the following steps:
   obtaining whey,
   electrodialysis of the whey at a temperature of 30° C. to 60° C.,
   acidification of the whey to a pH between 2 and 3.5,
   pasteurization of the acidified whey,
   electrodialysis of the pasteurized acidified whey at a temperature of 30° C. to 60° C.,
   neutralization of the demineralized whey to a pH between 6.7 and 7.2.

Surprisingly, the inventors have observed that the specific conditions implemented in the demineralization method made it possible to dispense with an ion exchange step while reducing the known disadvantages of electrodialysis. Indeed, the inventors observed in particular that the implementation of an acidification and pasteurization step, after a first electrodialysis step, then made it possible to continue the demineralization by means of a second electrodialysis step, without this posing the problems conventionally encountered with this method, namely a limited demineralization rate, fouling of the membranes, and an insufficient service life.

The first step in the method is to obtain whey. The whey may be a sweet whey or an acid whey.

In the context of the invention, the acid whey may be the liquid obtained by coagulation of milk via acidification caused by the metabolism of lactic acid bacteria. In general, the composition of acid whey is as follows:
lactose: 4.0-5.0%
proteins: 0.6-0.7%
mineral salts (mainly $Na^+$, $K^+$ and $Ca^{2+}$): 0.7-0.8%
fat: 0.05-0.1%
dry matter content (total dry extract): 5.3-6.0%
acidity: pH 4.3-4.6

In the context of the invention, the term "sweet whey" refers to the liquid obtained after coagulation of casein with rennet during the production of cheese. As mentioned earlier, sweet whey is a known co-product of the cheese industry. In general, the composition of sweet whey is as follows:
lactose: 4.0-5.0%
proteins: 0.6-0.8%
mineral salts (mainly $Na^+$, $K^+$ and $Ca^{2+}$): 0.4-0.6%
fat: 0.2-0.4%
dry matter content (total dry extract): 5.3-6.6%
acidity: pH 5.9-6.5

In a preferred embodiment, the whey provided is sweet whey. According to this embodiment, the sweet whey may be in unprocessed form or in concentrated form. Similarly, it may also be whey reconstituted from whey powder.

According to a variant of this preferred embodiment, the sweet whey is a concentrated sweet whey, advantageously heat-concentrated under conditions of moderate heating until a dry extract of 18 to 25% is obtained. Preferably, the sweet whey has a dry extract of 18 to 23%, and more particularly about 20% of dry extract. Whey can also be defined by its conductivity characteristics and its ash content. According to this embodiment, the concentrated whey provided has a conductivity Q of 13.5 to 14.5 mS/cm at 20° C. and an ash content of 7.8 to 8.4.

Advantageously, the whey provided may also be skimmed and clarified before the electrodialysis step.

The second step of the method according to the invention consists of electrodialysis of the whey. This first electrodialysis is carried out at a temperature of 30° C. to 60° C., preferably at a temperature of 35° C. to 55° C., and more preferably at a temperature of 40° C. to 50° C. For example, this electrodialysis step may be performed at a temperature of about 45° C.

The electrodialysis step is carried out until the desired demineralization rate is reached, namely for this step a demineralization rate of at least 30%, at least 40%, and more particularly a demineralization rate of about 50%.

The expression "demineralization rate" represents the ratio of the amounts of mineral salts eliminated from the whey (in other words the difference between the amounts of mineral salts in the initial whey and the residual amounts in the demineralized whey) to the amounts of mineral salts in the initial whey, at the same dry matter percentages.

Those skilled in the art can evaluate the demineralization rate of whey via its conductivity. In addition, the ash content of demineralized whey can also be an indicator of the demineralization rate achieved.

For the purposes of the present invention, the term "ash" is understood to mean the product resulting from incinerating the dry matter of the whey. In the present invention, the ash content is determined according to standard NF 04-208.

In this second step of the method according to the invention, the electrodialysis is carried out so as to obtain a conductivity of the whey of between 4.0 and 5.0 mS/cm and/or an ash content of between 3.3 and 3.9, which corresponds to a demineralization rate of about 50%.

The third step of the method consists of acidifying the whey to a pH between 2 and 3.5. The inventors have in fact observed that acidification of the whey and working at a low pH have several advantages, particularly for the efficiency of the electrodialysis. On the one hand, the efficiency is increased because the low pH promotes ionization of the divalent and trivalent salts present in the whey and thus for example increases the availability of calcium or magnesium. On the other hand, this lowers the viscosity of the whey and leads to better passage of the ions through the electrodialysis membranes. As a result, fouling of the membranes is reduced and their service life is increased.

In addition, maintaining the whey at a pH between 2 and 3.5 ensures the thermal stability of serum proteins by preventing their flocculation and denaturation during pasteurization. This point is of particular interest in maintaining the nutritional quality of demineralized whey. Advantageously, the acidic pH also prevents any bacteriological growth during the demineralization operation.

Finally, maintaining the acidic conditions according to the invention in the demineralization method is also advantageous in that it makes it possible to reduce the consumption of water and chemicals.

The acidification is carried out in a manner that decreases and maintains the pH of the whey at a value from 2.0 to 3.5. Preferably, the pH of the whey is lowered and maintained at a value from 2.5 to 3.2, and more preferably at a value approximately equal to 3. The decrease in the pH can be carried out via means known to those skilled in the art, for example such as the use of a hydrochloric acid (HCl) solution.

The fourth step of the method according to the invention consists of a step of pasteurizing the acidified whey. This pasteurization makes it possible to significantly reduce the number of microorganisms present in the whey, and in particular to eliminate the most resistant bacteria, such as spore-forming and heat-resistant bacteria, but without altering the proteins. This step also has the advantage of allowing the electrodialysis step to be carried out at higher temperatures than those conventionally used.

This pasteurization step is carried out at a temperature between 90° C. and 125° C. and for a duration of between 5 seconds and 30 minutes, preferably for a duration of between 5 seconds and 15 minutes, and more preferably for a duration of between 10 seconds and 5 minutes, for example such as about 5 minutes.

According to one particular embodiment, the pasteurization is carried out for a duration of 3 to 7 minutes and at a temperature of 90° C. to 100° C. and preferably at a temperature of about 95° C. and for a duration of about 5 minutes.

According to another particular embodiment, the pasteurization is carried out for a duration of 5 to 20 seconds and at a temperature of 105° C. to 125° C. and preferably at a temperature of 110° C. to 120° C. and for a duration of 10 to 15 seconds.

According to another particular embodiment, the pasteurization is carried out for 1 to 20 min and at a temperature of between 80 and 120° C., preferably for 1 to 10 minutes and at a temperature of between 90 and 100° C., and more preferably for about 5 minutes and at a temperature of about 95° C.

Conventionally, in whey demineralization methods the pasteurization is carried out under mild conditions, namely at temperatures of 70° C. to 80° C. and for a duration of 10 to 15 seconds, in order to eliminate the bacterial cultures used for making cheese and the yeasts without significantly altering the serum proteins. However, these mild conditions have the disadvantage of not allowing the elimination of heat-resistant bacteria.

As mentioned above, during pasteurization according to the invention, the serum proteins do not flocculate and are not denatured due to maintaining the whey at an acidic pH of between 2 and 3.5. This point is of particular interest in maintaining the nutritional qualities of demineralized whey.

The fifth step of the method according to the invention consists of a step of electrodialysis of the acidified and pasteurized whey. As previously mentioned, in this step, the ionized salts in solution in the whey migrate under the effect of an electric field through membranes selectively permeable to the cations and anions, and are eliminated in the form of brines. The electrodialysis step is carried out at a temperature of 30° C. to 60° C., preferably at a temperature of 35° C. to 55° C., and more preferably at a temperature of 40° C. to 50° C. For example, the electrodialysis step may be carried out at a temperature of about 45° C.

Advantageously, these temperatures make it possible to contribute to reducing the viscosity of the whey and to better dissociation of the mineral salts. In addition, although the temperatures used in the electrodialysis are higher than those conventionally used, the previously acidified and pasteurized whey retains high microbiological stability and does not develop any harmful flora.

The electrodialysis step is carried out until the desired demineralization rate of the acidified whey is reached, namely a demineralization rate of at least 70%, at least 75%, at least 80%, at least 85%, or even at least 90%.

Preferably according to this step, the acidified whey exhibits a demineralization rate of about 70%, and more preferably a demineralization rate of about 90%.

This second electrodialysis step thus makes it possible to obtain a significant demineralization rate for the whey while avoiding the problems conventionally encountered with this technique.

The method according to the invention thus makes it possible to obtain a demineralized whey solely by means of electrodialysis. Thus, unlike what is known from the prior art, the demineralization method does not include any ion exchange step(s), for example such as a step of replacing divalent cations with protons and a step of replacing divalent anions with chloride ions.

As previously mentioned, a person skilled in the art can evaluate the demineralization rate of the acidified whey by means of the conductivity and the ash content of the demineralized whey.

According to one particular embodiment, the second electrodialysis step is carried out so as to obtain a conductivity of the whey of between 2.0 and 3.0 mS/cm, and/or an ash content of 0.8 to 1.5, which corresponds to a demineralization rate of about 70%.

According to another particular embodiment, the second electrodialysis step is carried out so as to obtain a conductivity of the whey of between 1.0 and 1.5 mS/cm, and/or an ash content of 0.8 to 1.5 which corresponds to a demineralization rate of about 90%.

When the electrodialysis step results in obtaining whey exhibiting the target demineralization rate, the method according to the invention comprises a neutralization step. Advantageously, the neutralization is carried out concurrently with the second electrodialysis step.

Neutralization is a technique known to those skilled in the art, which consists of bringing the pH of a solution or of an effluent to a value fixed according to requirements. In the present invention, neutralization is carried out on the demineralized whey in order to raise the pH to a value of 6.5 to 7.4, preferably 6.7 to 7.2.

For the neutralization step, the basic solutions known to those skilled in the art may be used, for example solutions of potassium hydroxide, sodium hydroxide, or a mixture thereof. Neutralization leads to an increase in the conductivity of whey demineralized by electrodialysis, and a mild final demineralization step by electrodialysis of said whey makes it possible to obtain a conductivity of between 2.0 and 3.0 mS/cm for a whey demineralized to 70%, or a conductivity of between 0.8 and 1.5 mS/cm for a whey demineralized to 90%.

Thus, after neutralization, the demineralized whey according to the invention has a demineralization rate of at least 70%, at least 75%, at least 80%, at least 85%, or even at least 90%.

According to one particular embodiment, the neutralization may be carried out before the second electrodialysis step. In this embodiment, the neutralization is carried out on the demineralized whey in order to raise the pH to a value of 6.0 to 6.5, preferably 6.1 to 6.3. This particular embodiment advantageously makes it possible to better take into account the variability in the mineral quality of whey supplied in the first step of the method according to the invention.

The demineralized whey of the invention has an ash content of less than 4%, preferably less than 2.7%, and more particularly an ash content of less than 1.1%.

The demineralized whey of the invention finds particular applications in the field of nutrition and dietetics, particularly in the preparation of milks intended for child nutrition. Advantageously, the demineralized whey according to the method of the invention finds an application in the manufacture of milks intended for feeding infants.

A second object of the invention relates to a demineralized whey which can be obtained by the method described above.

The demineralized whey obtained according to the method of the invention has a specific composition of ions and can therefore be characterized by very specific amounts of $Na^+$, $K^+$, $Ca^+$, $Mg^+$, $Cl^-$ and P.

Thus, the 70% demineralized whey according to the invention may for example have the following quantities of ions, said quantities being expressed in mg/100 g of dry extract of demineralized whey:

$Na^+$: from 400 to 750, preferably from 450 to 650, $K^+$: from 75 to 200, preferably from 85 to 180, and more particularly from 90 to 175, $Ca^+$: from 100 to 300, preferably from 115 to 275, and more particularly from 130 to 250, $Mg^+$: from 45 to 95, preferably from 55 to 85, and more particularly from 65 to 80, $Cl^-$: from 10 to 130, preferably from 20 to 120, and more particularly from 25 to 115, P: from 100 to 270, preferably from 120 to 250, and more particularly from 135 to 235.

The 90% demineralized whey according to the invention may for example have the following quantities of ions, said quantities being expressed in mg/100 g of dry extract of demineralized whey:
- Na$^+$: from 81 to 105, preferably from 86 to 100, and more particularly from 90 to 96,
- K$^+$: from 156 to 186, preferably from 161 to 181, and more particularly from 166 to 176,
- Ca$^{2+}$: from 125 to 153, preferably from 128 to 148, and more particularly from 133 to 143,
- Mg$^{2+}$: from 58 to 76, preferably from 62 to 72, and more particularly from 65 to 69,
- Cl$^-$: from 17 to 35, preferably from 21 to 31, and more particularly from 24 to 28,
- P: from 124 to 152, preferably from 127 to 147, and more particularly from 132 to 142.

The invention will be better understood with the help of the following examples which are purely illustrative and in no way limit the scope of the protection.

EXAMPLES

The ash content is determined according to standard NF 04-208.

Example 1: Preparation of Demineralized Whey According to the Invention

Test 1: For this test, 3 solutions were prepared and placed in tanks, their contents listed below:
- Tank 1: solution of 20 L of concentrated sweet whey at 19.63% dry extract. The solution has a temperature of 30.8° C. and a conductivity of 13.71 mS/cm. The solution was pasteurized at 95° C. for 5 minutes.
- Tank 2: brine solution prepared with 20 L of tap water at 40° C. and acidified with a few drops of 37% HCl. The pH of the solution is 2.89.
- Tank 3: electrolyte solution prepared with 18 L of tap water at 30° C. and a few drops of 95% H$_2$SO$_4$ to adjust the conductivity between 15 and 18 mS/cm (at 20° C.). The solution has a conductivity of 16.37 mS/cm (at 20° C.), a pH equal to 1.43, and a temperature of 27.6° C.

The electrodialysis is started and the pH and the conductivity are checked continuously by means of previously calibrated probes.

When the conductivity of the whey reaches 4.52 mS/cm, the electrodialysis is stopped. 15 L of brine are then removed and replaced with tap water whose pH has been adjusted to 2.79 by adding HCl, and the electrodialysis is restarted.

Finally, the electrodialysis is stopped again when the solution of acidified demineralized whey has a conductivity of 2.56 mS/cm.

To carry out the neutralization, 75 mL of 40% NaOH are added to tank 1 to adjust the pH to 6.6; the conductivity is 3.88 mS/cm. 15 L of brine are removed and replaced with tap water at 40° C. whose pH has been adjusted to 2.86. The electrodialysis is restarted for a duration of approximately 30 minutes until the solution of demineralized whey has a conductivity of 2.74 mS/cm.

Samples are collected after the first electrodialysis is stopped (sample 1) and after the second electrodialysis is stopped at the end of the method (sample 2), in order to perform analyses on the characteristics of the demineralized whey obtained. The results are shown in Table 1 below.

TABLE 1

| | | Parameters analyzed | | | | | | | | |
|---|---|---|---|---|---|---|---|---|---|---|
| | pH | Na$^+$ | K$^+$ | Ca$^{2+}$ | Mg$^{2+}$ | ES % | Ash %/dry matter | Total nitrogenous matter | Cl$^-$ | P |
| | | mg/100 g dry extract | | | | | | mg/100 g dry extract | | |
| Sample 1 | 3.8 | 84 | 166 | 265 | 16 | 18.8 | 2.2 | 13.8 | 299 | 255 |
| Sample 2 | 6.5 | 486 | 115 | 236 | 15 | 18.7 Demineralization rate | 2.2 73% | 13.8 | 107 | 229 |

A mass balance was assessed in order to verify the transfer of ions (sodium, potassium, calcium, magnesium, and chlorine) through the membranes. This assessment confirms that the quantities of ions that have disappeared from the whey are found in the brine solution, with a relative difference between the quantities of less than 15%.

The whey demineralized according to the method of the invention has a demineralization rate of 73% and the mineral composition is in accordance with the specifications.

Test 2: This test was reproduced under the same operating conditions as test 1, but with slightly different starting solutions. Three new solutions were therefore prepared and placed in tanks, their contents listed below:
- Tank 1: solution of 20 L of concentrated sweet whey at 19.58% dry extract. The solution has a temperature of 29.9° C. and a conductivity of 13.85 mS/cm. The solution was pasteurized at 95° C. for 5 minutes.
- Tank 2: brine solution prepared with 20 L of tap water at 29.5° C. and acidified with a few drops of 37% HCl. The pH of the solution is 3.09.
- Tank 3: electrolyte solution prepared with 18 L of tap water at 30° C. and a few drops of 95% H$_2$SO$_4$. The solution has a conductivity of 18.49 mS/cm (at 20° C.), a pH equal to 1.24, and a temperature of 30.7° C.

Each of the tanks is connected to an electrodialyzer having the same characteristics as that of test 1.

The electrodialysis is started and the pH and conductivity are checked continuously by means of previously calibrated probes.

When the conductivity of the whey reaches 4.49 mS/cm, the electrodialysis is stopped. 20 L of brine are then removed and replaced with tap water whose pH has been adjusted to 2.88 by adding HCl, and the electrodialysis is restarted.

Finally, the electrodialysis is stopped again when the solution of demineralized acidified whey has a conductivity of 2.77 mS/cm.

To carry out the neutralization, 86 mL of 40% NaOH are added to tank 1, bringing the pH of the serum to 6.65; the conductivity of the serum is then 4.33 mS/cm.

20 L of brine are removed and replaced with tap water at 40° C. whose pH has been adjusted to 2.87. The electrodialysis is restarted for a duration of approximately 30 minutes until the solution of demineralized whey has a conductivity of 3.02 mS/cm and a pH of 6.50.

Samples are collected after the first electrodialysis is stopped (sample 1) and after the second electrodialysis is stopped at the end of the method (sample 2), in order to perform analyses on the characteristics of the demineralized whey obtained. The results are shown in Table 2 below.

TABLE 2

| | Parameters analyzed | | | | | | | | |
|---|---|---|---|---|---|---|---|---|---|
| | pH | Na$^+$ K$^+$ Ca$^{2+}$ Mg$^{2+}$ mg/100 g dry extract | | | | ES % | Ash %/Dry matter | Total nitrogenous matter mg/100 g dry extract | Cl$^-$ P |
| Sample 1 | 3.4 | 92 | 182 | 266 | 87 | 18.8 | 1.8 | 13.7 | 370 266 |
| Sample 2 | 6.5 | 645 | 124 | 229 | 79 | 18.7 | 2.4 | 13.8 | 114 235 |
| | | | | Demineralization rate | | | 70% | | |

A mass balance was assessed in order to verify the transfer of ions (sodium, potassium, calcium, magnesium and chlorine) through the membranes. This assessment confirms that the quantities of ions that have disappeared from the whey are found in the brine solution, with a relative difference between the quantities of less than 15%.

The whey demineralized according to the method of the invention has a demineralization rate of 70% and the mineral composition is in accordance with the specifications.

To increase the demineralization rate of this whey.

to 3.8 mS/cm. 20 L of brine are removed and replaced with tap water at 40° C. whose pH has been adjusted to 2.87. The electrodialysis is restarted for a duration of approximately 30 minutes until the solution of demineralized whey has a conductivity of 2.78 mS/cm and a pH of 6.7.

Samples are collected after the first electrodialysis is stopped (sample 1) and after the second electrodialysis is stopped at the end of the method (sample 2) in order to perform analyses on the characteristics of the demineralized whey obtained. The results are shown in Table 3 below.

TABLE 3

| | Parameters analyzed | | | | | | | | |
|---|---|---|---|---|---|---|---|---|---|
| | pH | Na$^+$ K$^+$ Ca$^{2+}$ Mg$^{2+}$ mg/100 g dry extract | | | | ES % | Ash %/Dry matter | Total nitrogenous matter mg/100 g dry extract | Cl$^-$ P |
| Sample 1 | 3.7 | 73 | 132 | 222 | 75 | 19.1 | 3.7 | 13.0 | 210 257 |
| Sample 2 | 6.7 | 576 | 99 | 195 | 72 | 19.1 | 2.5 | 13.0 | 96 225 |
| | | | | Demineralization rate | | | 69% | | |

Test 3: This test was reproduced under the same operating conditions as tests 1 and 2, but with slightly different starting solutions. Three new solutions were therefore prepared and placed in tanks, their contents listed below:

Tank 1: solution of 20 L of concentrated sweet whey at 19.7% dry extract. The solution has a temperature of 29.9° C. and a conductivity of 13.85 mS/cm. The solution was pasteurized at 95° C. for 5 minutes.

Tank 2: brine solution prepared with 20 L of tap water at 33.5° C. and acidified with a few drops of 37% HCl. The pH of the solution is 3.01.

Tank 3: electrolyte solution prepared with 18 L of tap water at 30° C. and a few drops of 95% $H_2SO_4$ to adjust the conductivity to between 15 and 18 mS/cm (at 20° C.). The solution has a conductivity of 17.28 mS/cm (at 20° C.), a pH equal to 1.23, and a temperature of 36.1° C.

Each of the tanks is connected to the electrodialyzer having the same characteristics as that of test 1.

The first electrodialysis step is started and the pH and conductivity are checked continuously by means of previously calibrated probes.

When the conductivity of the whey reaches 4.51 mS/cm, the electrodialysis is stopped.

20 L of brine are then removed and replaced with tap water whose pH has been adjusted to 2.92 by adding HCl, and the electrodialysis is restarted.

Finally, the electrodialysis is stopped again when the solution of demineralized whey has a conductivity of 2.26 mS/cm.

To carry out the neutralization, 84 mL of 40% NaOH are added to tank 1, bringing the pH to 6.8 and the conductivity A mass balance was assessed in order to verify the transfer of ions (sodium, potassium, calcium, magnesium and chlorine) through the membranes. This assessment confirms that the quantities of ions that have disappeared from the whey are found in the brine solution, with a relative difference between the quantities of less than 15%.

The whey demineralized according to the method of the invention has a demineralization rate of 69% and the mineral composition is in accordance with the specifications.

Example 2: Preparation of a Whey Demineralized to about 90% According to the Invention Using the same operating conditions as Test 1 of Example 1 and with the same solutions in the tanks, electrodialysis is started until the conductivity of the acidified whey reaches 3.02 mS/cm.

Neutralization is performed with a mixture of sodium hydroxide:potassium hydroxide (1:3) to achieve a pH of 6.7 and a conductivity of 5.37 mS/cm. 5 L of brine are removed and replaced with a 40° C. tap water solution. Electrodialysis is restarted for about 2 hours and then stopped again when the solution of demineralized whey has a conductivity of 1.04 mS/cm and a pH of 6.5.

Samples are collected after the first electrodialysis is stopped (sample 1) and after the second electrodialysis is stopped at the end of the method (sample 2) in order to perform analyses on the characteristics of the demineralized whey obtained. The results are shown in Table 4 below.

TABLE 4

| | Parameters analyzed | | | | | | | | |
|---|---|---|---|---|---|---|---|---|---|
| | pH | Na$^+$ | K$^+$ | Ca$^{2+}$ | Mg$^{2+}$ | ES % | Ash %/Dry matter | Total nitrogenous matter mg/100 g dry extract | Cl$^-$ | P |
| | | mg/100 g dry extract | | | | | | | | |
| Sample 1 | 3.7 | 91 | 189 | 323 | 95 | 18.2 | 1.7 | 13.9 | 316 | 143 |
| Sample 2 | 6.6 | 93 | 171 | 138 | 67 | 18.0 | 0.9 | 14.0 | 26 | 137 |
| | | | | Demineralization rate | | | 89% | | | |

A mass balance was assessed in order to verify the transfer of ions (sodium, potassium, calcium, magnesium and chlorine) through the membranes. This assessment confirms that the quantities of ions that have disappeared from the whey are found in the brine solution, with a relative difference between the quantities of less than 20%.

The whey demineralized according to the method of the invention has a demineralization rate of 89% and the mineral composition is in accordance with the specifications.

The invention claimed is:

1. A method for demineralizing whey, comprising the following steps:
   a first step of obtaining whey,
   electrodialysis of said whey at a temperature of 30° C. to 60° C.,
   acidification of the whey to a pH between 2 and 3.5 thereby obtaining acidified whey,
   pasteurization of the acidified whey thereby obtaining pasteurized acidified whey,
   electrodialysis of the pasteurized acidified whey at a temperature of 30° C. to 60° C. thereby obtaining electrodialysed pasteurized acidified whey, and
   neutralization of the electrodialysed pasteurized acidified whey to a pH between 6.7 and 7.2.

2. The method according to claim 1, wherein the whey obtained in the first step is concentrated whey of 18 to 25% of dry extract.

3. The method according to claim 1, wherein the step of electrodialysis of the whey is carried out so as to obtain a conductivity of said whey of between 4.0 and 5.0 mS/cm.

4. The method according to claim 1, wherein the step of electrodialysis of the pasteurized acidified whey is carried out so as to obtain a conductivity of said pasteurized acidified whey of between 2.0 and 3.0 mS/cm.

5. The method according to claim 1, wherein the step of electrodialysis of the pasteurized acidified whey is carried out so as to obtain a conductivity of said pasteurized acidified whey of between 1.0 and 1.5 mS/cm.

6. The method according to claim 1, wherein the pasteurization is carried out for 1 to 20 min and at a temperature of between 80 and 120° C.

7. The method according to claim 1, wherein the electrodialysis steps are carried out at a temperature of 35° C. to 55° C.

8. The method according to claim 1, wherein the neutralization step is carried out concurrently with the electrodialysis step on the pasteurized acidified whey.

9. The method according to claim 1, wherein the pasteurization is carried out for 1 to 10 minutes and at a temperature of between 90 and 100° C.

10. The method according to claim 1, wherein the pasteurization is carried out for about 5 minutes and at a temperature of about 95° C.

11. The method according to claim 1, wherein the electrodialysis steps are carried out at a temperature of 40° C. to 50° C.

* * * * *